P. OFFILL & E. G. PLUMMER.
PLANTER.
APPLICATION FILED MAY 23, 1910.
1,021,726.
Patented Mar. 26, 1912.
3 SHEETS—SHEET 1.
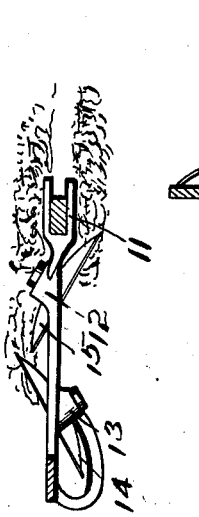
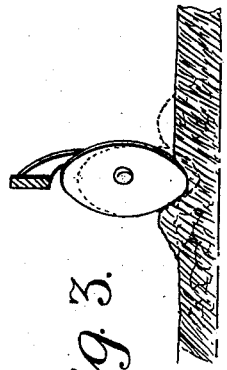
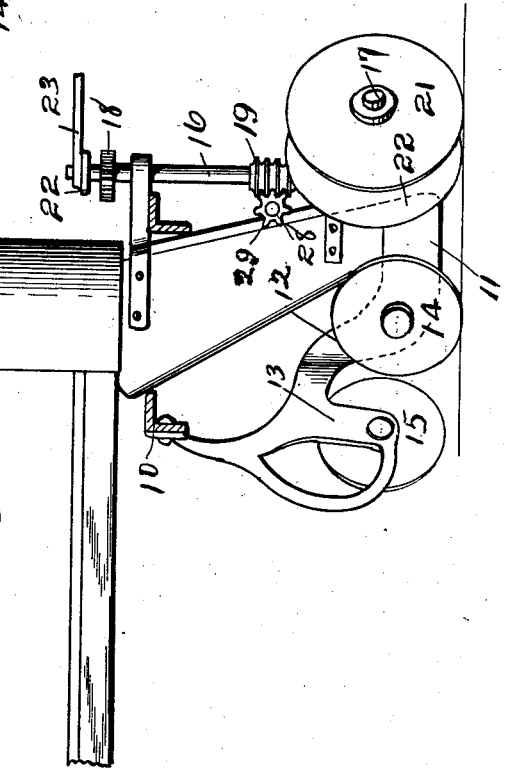
Witnesses.
A. G. Hague.
F. C. Caswell
Inventors
Preston Offill and
E. G. Plummer
by J Ralph Drig Atty

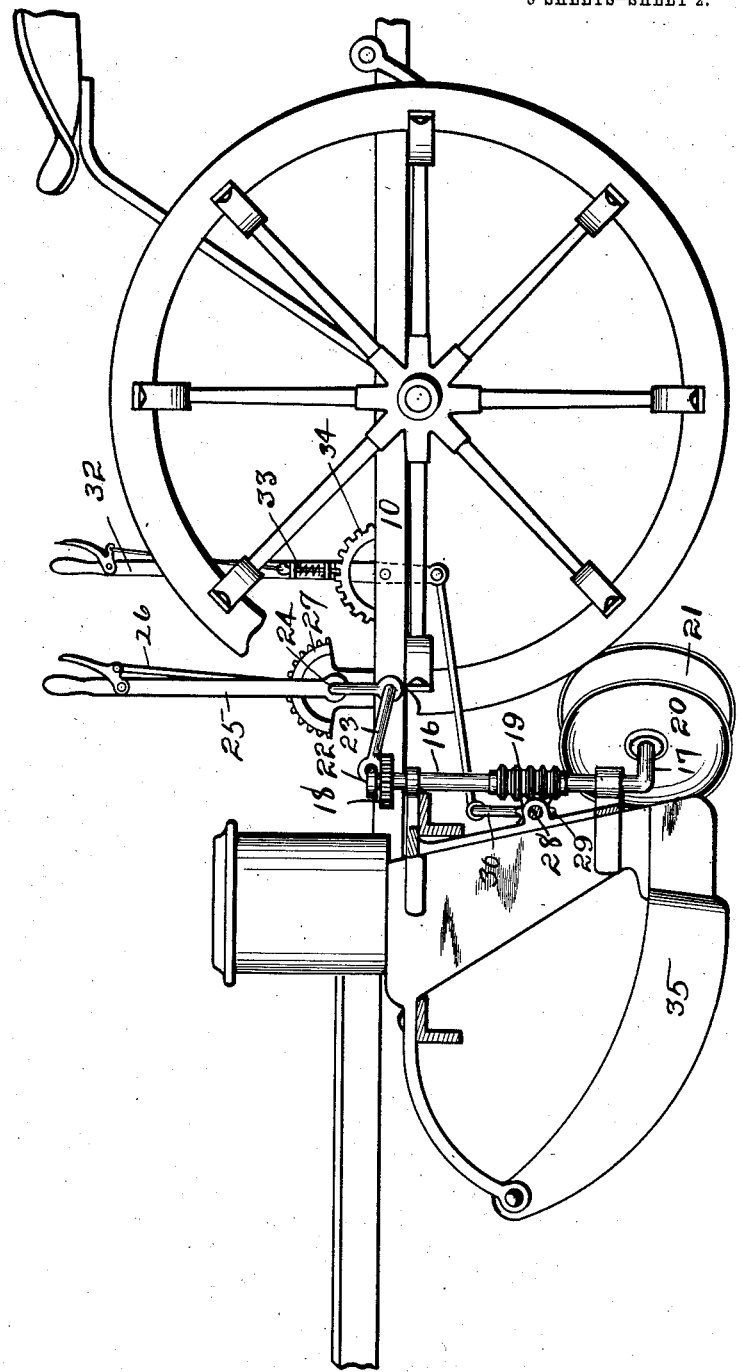

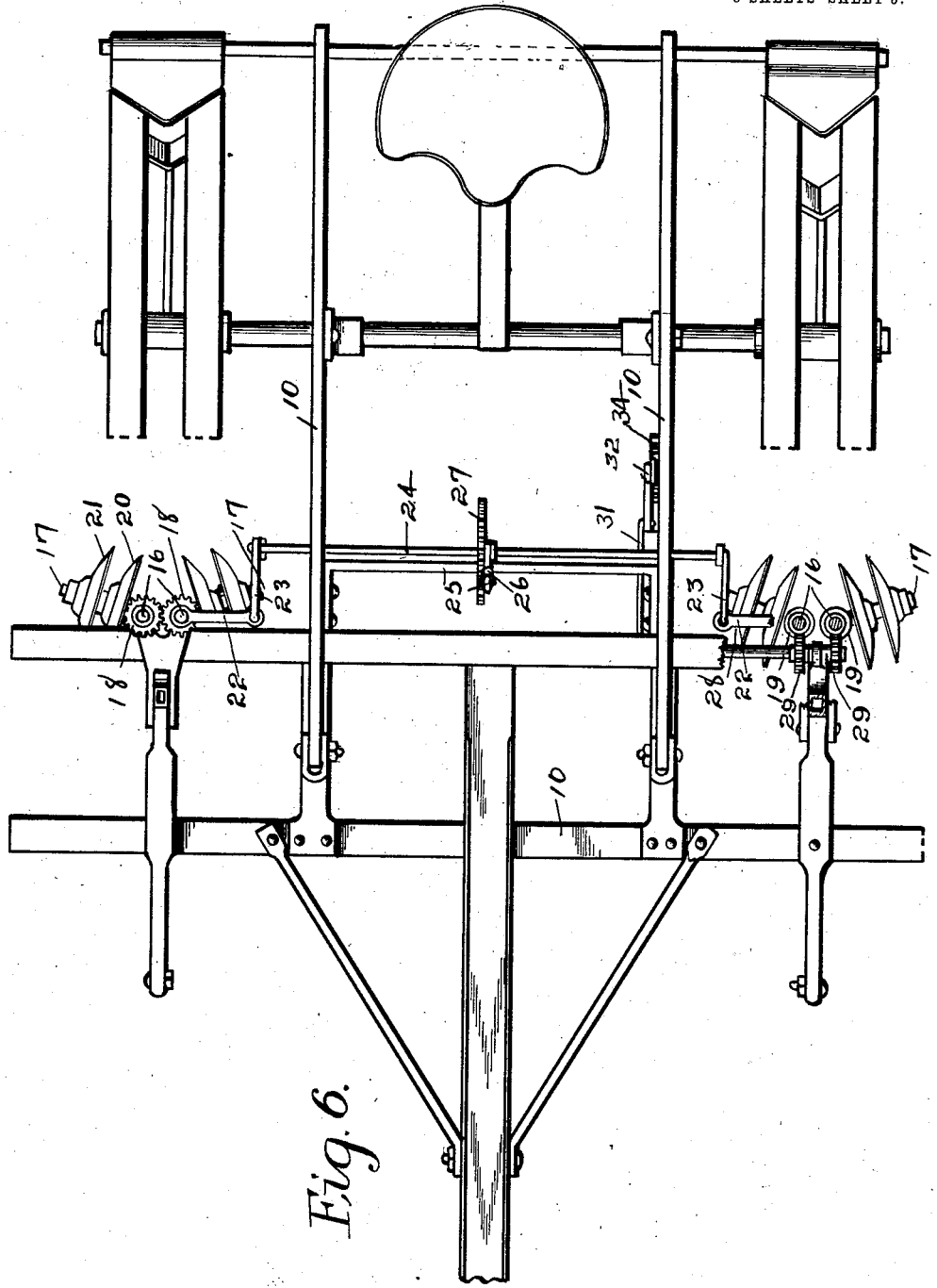

UNITED STATES PATENT OFFICE.

PRESTON OFFILL, OF COLLEGEVIEW, NEBRASKA, AND EZRA G. PLUMMER, OF ALTOONA, IOWA.

PLANTER.

1,021,726. Specification of Letters Patent. Patented Mar. 26, 1912.

Application filed May 23, 1910. Serial No. 562,906.

*To all whom it may concern:*

Be it known that we, PRESTON OFFILL and EZRA G. PLUMMER, citizens of the United States, residing at Collegeview and Altoona, in the counties of Lancaster and Polk and States of Nebraska and Iowa, respectively, have invented a certain new and useful Planter, of which the following is a specification.

The object of our invention is to provide a planter of simple, durable and inexpensive construction and so arranged as to open a furrow to uniform depth and to remove all obstructions from the path of the planter and to pile the earth equally upon both sides of the furrow when opened and also to provide improved means for closing the furrow in such a manner that the earth will be taken from both sides of the furrow and piled in a uniform rounded ridge on top of the seeds with rounded depressions on both sides of the ridge to thereby prevent water from running in the ditch left by the planter in line with the planted seeds, and to cause the running water to travel along the sides of the row of planted seeds so that the seeds will not be washed out during excessive rains, and also to provide means for cultivating the earth on both sides of the planted row.

A further object is to provide manually operated means conveniently accessible to the driver for adjusting the furrow closing disks vertically and also for tilting them laterally to suit the requirements of actual use and to form a smoothly rounded ridge for the planted seeds under varied conditions of the ground.

Our invention consists in certain details, in the construction, arrangement and combination of the various parts of the device, whereby the objects contemplated are attained, as hereinafter more fully set forth, pointed out in our claims, and illustrated in the accompanying drawings, in which:

Figure 1 shows a sectional view of a part of a planter having our improvement applied thereto. Fig. 2 shows a top or plan view illustrating our improved furrow opener. Fig. 3 shows a sectional view to illustrate the form of furrow opened by means of our improvement. Fig. 4 shows a similar view showing the rounded ridge after being planted and the depressions at the sides thereof to form channels. Fig. 5 shows a side elevation of a planter embodying our invention illustrating a modification in which an ordinary runner is used as a furrow opener, part of the frame of the device being shown in section, and Fig. 6 shows a top or plan view of a corn planter embodying our invention, there being runners of the ordinary type for furrow openers.

Referring to the accompanying drawings, we have used the reference numeral 10 to indicate the frame of a corn planter. The frame is of ordinary construction and hence it is not illustrated or described in detail. In the form of our invention illustrated in Fig. 1, the runner 11 is made of the ordinary type except that it is much shorter in length than the ones in ordinary use and its forward extension is provided with a part 12 extending forwardly and laterally in one direction and a part 13 extending forwardly and laterally in an opposite direction as clearly illustrated in Fig. 2. In order to open a furrow and remove obstructions in the path of the runner, we provide two furrow opening disks 14 and 15, the disk 14 being rotatably mounted on the part 12 and the disk 15 on the part 13, the latter disk being raised slightly above the disk 14. The lower edges of said disks and the lower edge of the runner 11 are all in line as clearly shown in Fig. 2. By this arrangement it is obvious that as the planter is advanced over a field the disk 15 will enter the ground a slight distance and will throw the earth toward the right as shown in Fig. 2, then the disk 14 will form a somewhat deeper furrow and throw the earth toward the left as shown in Fig. 2, then the runner proper will smooth out a path in the center of the furrow thus dug, suitable to receive the seeds to be planted which are dropped through the runner in the ordinary way. Immediately in the rear of each runner are two upright shafts 16 capable of both rotary and vertical sliding movement. These shafts are arranged side by side and each is provided with an extension 17 on its lower end at right angles to the shaft. The upper ends of said shafts 16 are connected by means of two pinions 18 in mesh with each other and on the central portion of each shaft we have formed cog teeth 19 for purposes hereinafter made clear. On each extension 17 are rotatably mounted two disks 20 and 21. The extension 17 on the outer one of the shafts 16 is inclined outwardly and slightly rearwardly while the extension 17 on the other shaft is inclined inwardly and slightly rearwardly so that the lower edges of said disks will run at the sides of the furrow, the two latter disks being close to the furrow and the outer ones being spaced apart from it, all of the disks being so arranged as to deliver the earth at the sides of the furrow toward the center of the furrow.

In order to provide for tilting all of the extensions 17 forwardly or rearwardly at the same angle relative to a transverse line through the machine, we have provided on the inner one of each pair of shafts 16 an arm 22 and pivotally attached to the inner ends of these arms 22 are the links 23, which links are connected at their ends with a cross rod 24 to which a lever 25 is attached. This lever is provided with a pawl 26 to engage a stationary sector 27 on the machine frame so that the operator may, by manipulating said lever, adjust the angles of all of the extensions 17 at the same time.

In order to provide for vertically adjusting all of the disks 20 and 21, we have provided a cross shaft 28 having thereon a small pinion 29 for each of the sets of cog teeth 19. This shaft is provided with a central crank 30 which is pivotally connected by means of a link 31 with the lever 32 which is fulcrumed to the machine frame and which is provided with a pawl 33 to engage a stationary sector 34.

In the modified form of the invention illustrated in Figs. 5 and 6, we have shown a furrow opener 35 which consists of an ordinary planter runner.

In practical use and assuming that our improved planter is being moved over a field then obviously the forward disk 15 will tend to remove obstructions from the path of the runner and throw a portion of the earth to one side, then the disk 14 will form a furrow still deeper and will throw the earth removed by it to the opposite side of the furrow; then the lower edge of the runner will smooth out the bottom of the central portion of the furrow and form a suitable seed bed. After the seeds have been planted therein in the ordinary manner then the disks 20 that are adjacent to the furrow will throw back into the furrow the earth removed by the furrow opening disks and they will also pile the earth in a smoothly rounded ridge to completely cover the furrow and pile the earth on top of it. The outer set of disks 21 will cut into the earth outside of the paths of the inner disks 20 and will form furrows at the sides of the planted row and will also pile additional earth on top of the ridge formed by the first set of disks. The planter wheels which are preferably of the ordinary construction, that consists of two rims spaced apart, serve to pack the earth at the sides of the planted row and leave the earth loose and in the form of a smoothly rounded ridge over the planted seeds. By thus having a raised ridge over the planted row of seeds, it is obvious that during heavy rains the surplus water on the earth will follow the furrows at the sides of the planted row and will not tend to wash out the planted seeds. Furthermore by our improved device the planted seeds will lie only a slight distance below the general level of the earth and they will be covered by a mound of earth on top of the seeds; hence, in excessively wet weather the ridges of earth on top of the rows of planted corn will dry out first and prevent the seeds from rotting in the ground. In order to properly return the earth into the furrow to cover the seeds and to form a smoothly rounded ridge over the seeds under varying conditions of the ground it is necessary at times to raise and lower the furrow closing disks and also to change the angle of the extensions 17. This may be readily and easily done by means of the levers 25 and 32 which may be controlled by the driver on the planter.

We claim as our invention:

1. In a planter, the combination of a furrow opener, two shafts in the rear of and on opposite sides of the furrow opener, each of said shafts being provided near its lower end with a horizontally arranged extension, disks rotatably mounted on each extension, means for vertically adjusting said shafts, and means for moving the shafts to adjust the angles of the disk, said means comprising pinions on said shafts in mesh with each other, an arm fixed to one of the shafts and a lever connected with said arm.

2. The combination with a furrow opener, of two shafts in the rear of and on opposite sides of the furrow opener, each of said shafts being provided with a horizontally arranged extension, a disk rotatably mounted on each extension, and means for rocking the shafts to adjust the angles of the disks, said means comprising pinions on said shafts in mesh with each other, an arm fixed to one of the shafts, and a lever connected with said arm.

3. The combination of a furrow opener, of two shafts slidingly and rotatably supported in the rear of and on opposite sides of the furrow opener, pinions on said shafts in mesh with each other, an arm on one of the shafts, a lever connected with said arm, gear teeth on each shaft, a horizontally arranged shaft having pinions thereon in mesh with said gear teeth, and means for rocking the horizontally arranged shaft to jointly raise and lower the said vertically arranged shafts, and horizontal extensions on the lower ends of said vertically arranged shafts, and two rotatable disks on each horizontal extension, substantially as and for the purposes stated.

4. An improved planter, comprising a runner, two furrow opening disks supported in advance of the runner, the forward one being arranged to form a furrow and to throw the earth in one direction and the other being arranged in a lower plane to deepen the furrow and throw the earth in an opposite direction, two vertically arranged shafts in the rear of the runner on opposite sides thereof having horizontal extensions on their lower ends, two disks rotatably mounted on each extension, means for vertically adjusting said shafts, and means for jointly rocking the shafts to change the angles of the horizontal extensions, for the purposes stated.

Des Moines, Iowa, May 6, 1910.

PRESTON OFFILL.
EZRA G. PLUMMER.

Witnesses:
MARY WALLACE,
M. B. GOLDIZEN.

Copies of this patent may be obtained for five cents each, by addressing the "Commissioner of Patents, Washington, D. C."